US007412350B2

(12) United States Patent
Fralic

(10) Patent No.: US 7,412,350 B2
(45) Date of Patent: Aug. 12, 2008

(54) SYSTEM AND METHOD FOR ESTIMATING PRODUCTION AND FEED CONSISTENCY DISTURBANCES

(75) Inventor: Gregory Richard Fralic, Waterloo (CA)

(73) Assignee: Metso Automation USA Inc., Shrewsbury, MA (US)

( * ) Notice: Subject to any disclaimer, the term of this patent is extended or adjusted under 35 U.S.C. 154(b) by 35 days.

(21) Appl. No.: 10/975,340

(22) Filed: Oct. 29, 2004

(65) Prior Publication Data

US 2006/0100823 A1 May 11, 2006

(51) Int. Cl.
*G06F 11/30* (2006.01)

(52) U.S. Cl. ........................................ 702/183

(58) Field of Classification Search ................. 702/183, 702/58, 63; 324/500; 700/292; 714/1
See application file for complete search history.

(56) References Cited

U.S. PATENT DOCUMENTS 6,165,317 A * 12/2000 Sabourin ..................... 162/23
6,597,959 B1 * 7/2003 Backa et al. .................. 700/30
6,752,165 B2 6/2004 Johansson
6,778,936 B2 8/2004 Johansson
6,892,973 B2 * 5/2005 Johansson et al. ........ 241/261.2
2005/0133643 A1 * 6/2005 Fernandez et al. ............ 241/16

OTHER PUBLICATIONS

Merriam-Webster's dictionary Tenth edition, 1993. p. 431.*
"On the Control of Chip Refining Systems", J. Hill et al., Pulp & Paper Canada 94:6, 1993, p. 43-47.
"kajaaniTQA™ & TMP Control Solution Functional Description TQA330510 V1.0 EN", Metso Automation, 2004, p. 1-26.
"A Practical Approach To The Control of TMP Refiners," Roche et al., Proceedings of Control Systems 96, Halifax, Apr. 1996, pp. 129-135.
Ismo Joensuu et al, Fuzzy Quality Control of a TMP Plant, International Mechanical Pulping Conference 2001, pp. 513-521.

* cited by examiner

*Primary Examiner*—Tung S Lau
(74) *Attorney, Agent, or Firm*—Oblon, Spivak, McClelland, Maier & Neustadt, P.C.

(57) ABSTRACT

A fiber processing system including a refiner configured to process fibrous matter. The system further includes a plurality of measurement units coupled to the refiner to measure different operating conditions of the refiner, and a first control system coupled to the plurality of measurement units and configured to receive a plurality of operation conditions of the refiner from the plurality of measurement units. A processing unit is coupled to the control system and configured to estimate a production disturbance and a feed consistency disturbance of the refiner based on the plurality of operation conditions. The system also includes a second control system coupled to the processing unit and configured to generate a target operating condition based on the production disturbance and the feed consistency disturbance. The first control system is further configured to control an operation of the refiner based on the target operating condition.

50 Claims, 6 Drawing Sheets

SYSTEM AND METHOD FOR ESTIMATING PRODUCTION AND FEED CONSISTENCY DISTURBANCES

BACKGROUND OF THE INVENTION

1. Field of the Invention

The invention relates to fiber manufacturing and, more particularly, to improving performance of a refiner. The invention can be particularly advantageous for monitoring and controlling, for example, a rotary disk refiner.

2. Description of the Related Art

Refiner devices are used to process the cellulose fibers of a fibrous matter prior to delivering the fibrous matter to a machine for manufacturing a fiber product, such as paper. Types of fibrous matter that are typically processed by refiners includes wood chips, pulp, and fabric. One type of refining process is typically referred to as a thermo-mechanical pulp ("TMP") process, in which abrasive forces are exerted on the fibrous matter to fibrillate the outer layers of the fibers. Refiners used in TMP processing can be arranged in several known configurations, including counter-rotating refiners, double-disc or twin refiners, and conical disc ("CD") refiners.

Maintaining a specific set of characteristics, such as burst and tear strength, from one batch of fiber products to another is of utmost importance in fiber manufacturing. However, it is difficult to maintain such characteristics in finished fiber products over time, even when specific parameters of the refiner can be monitored. Specifically, although measured refiner parameters may indicate the existence of disturbances in a refiner, known systems are unable to use these measurements to properly respond to these disturbances. One reason for this deficiency is that known control systems do not have the capability to fully characterize refiner disturbances, which can, for example, be related to production, feed consistency, and/or feed water. A production disturbance can be defined as an unexpected change in on-line stock throughput, while a feed consistency disturbance can be defined as an unexpected change in consistency of feed stock as it enters a refiner. A feed water disturbance can be defined as an unexpected change in a mass flow rate of dilution water.

Some known fiber manufacturing control systems include a distributed control system (DCS) that is coupled to multiple refiners in a fiber processing plant and that monitors specific parameters of each refiner. These parameters can include a motor load, a dilution water flow rate, a hydraulic load, a feed screw speed, a refiner case pressure, an inlet pressure, a refiner plate gap, and a refiner consistency. A DCS can also control the operation of a refiner based on measured parameters. For example, when a DCS determines that a measured motor load indicates a disturbance in the refiner, the DCS can attempt to address the disturbance by adjusting the speed of a feed screw, thus changing the on-line throughput of the refiner.

However, adjusting feed screw speed by the DCS may not sufficiently address the disturbance indicated by the detected change in motor load. In the above example, the DCS adjusts only the feed screw speed to address the disturbance based on the assumption that the disturbance is solely production-based. However, in reality, the disturbance may be related to both production and feed consistency, which is not affected by an adjustment to feed screw speed. Rather, feed consistency can be altered by adjusting a flow rate of dilution water or by changing a plate gap distance. As such, the response by the DCS to the disturbance may be improper or deficient.

In another example, when a DCS determines that a measured refiner consistency indicates a disturbance in the refiner, the DCS can attempt to address the disturbance by adjusting the dilution water flow rate, thus changing the feed consistency of the refiner. If the refiner consistency is held at a constant value, then any remaining motor load disturbance is then attributed to production and addressed by adjusting the speed of a feed screw. While this control strategy effectively eliminates the feed consistency and production disturbance, it requires a specific, rigid, control strategy. Thus, this control method only applies to refiners in which a feed screw speed can be adjusted, such as primary refiners.

Known systems are unable to measure or otherwise characterize production disturbances and feed consistency disturbances. Thus, such systems are unable to accurately adjust the operation of a refiner in response to such disturbances using a multivariable control approach that does not require a specific, rigid, control strategy and a feed screw with an adjustable speed. As a result, both manually-controlled processes and DCS-based processes rely on post-processing pulp quality feedback to make corrections for disturbances in production and feed consistency.

SUMMARY OF THE INVENTION

Accordingly, the present invention can advantageously provide for real-time estimation of production and feed consistency disturbances in a refiner. Once estimations of production and feed consistency are available, they can be used to accordingly adjust, for example, a TMP refiner plate gap, dilution, and feed screw speed. That is, having estimated measurements of production and feed consistency disturbances would allow for a correct control response to maintain specific energy and/or pulp quality.

In accordance with a first aspect of the present invention, a method is provided for estimating disturbances in a refiner. According to one example, the method includes measuring a first operating condition and a second operating condition of the refiner and then generating a predicted first operating condition based on the second operating condition. Also provided is a step of comparing the first operating condition to the predicted first operating condition. A first disturbance in the refiner is then estimated based on the comparing of the first operating condition to the predicted first operating condition.

In accordance with another aspect of the present invention, a method is provided for estimating disturbances in a refiner. By way of example, the method includes generating a predicted motor load and a predicted refiner consistency, and measuring a first motor load and a first refiner consistency. A second motor load is determined based on the predicted motor load and the first motor load, and a second refiner consistency is determined based on the predicted refiner consistency and the first refiner consistency. The disturbances in the refiner are determined based on the second motor load and the second refiner consistency.

In accordance with a further aspect of the present invention, a computer program product is provided. According to a preferred example, the computer program product includes a computer usable medium having a computer readable program code that, when executed, causes a computer to retrieve a first operating condition and a second operating condition of the refiner. Further, the program code, when executed, causes the computer to generate a predicted first operating condition based on the second operating condition. In addition, the program code, when executed, causes the computer to compare the first operating condition to the predicted first operating condition. Moreover, the computer estimates a first disturbance in the refiner based on the comparing of the first operating condition to the predicted first operating condition when the program is executed.

In accordance with a further aspect of the present invention, a system is provided for estimating disturbances in a refiner. By way of example, the system can include an arrangement for receiving a first operating condition and a second operating condition of the refiner, and an arrangement for generating a predicted first operating condition and a predicted second operating condition of the refiner. An arrangement for comparing is provided to compare the first operating condition to the predicted first operating condition, and to compare the second operating condition to the predicted second operating condition. The system can also include an arrangement for calculating disturbances in the refiner based on a comparison between the first operating condition and the predicted first operating condition, and based on a comparison between the second operating condition and the predicted second operating condition.

In accordance with a further aspect of the present invention, a system for controlling a refiner is provided. By way of example, the system can include a first control system coupled to the refiner, the first control system being configured to measure operating conditions of the refiner. A processing unit coupled to the control system can also be provided. The processing unit is configured to receive a first operating condition and a second operating condition of the refiner from the control system. Generating a predicted first operating condition based on the second operating condition can also performed by the processing unit. The processing unit can further be configured to compare the first operating condition to the predicted first operating condition, and to estimate a first disturbance in the refiner based on a comparison between the first operating condition and the predicted first operating condition. Also, the control system can be configured to control the refiner based on the first disturbance.

In accordance with a further aspect of the present invention, a fiber processing system is provided. According to a preferred example, the fiber processing system can include a refiner configured to process fibrous matter, and a plurality of measurement units coupled to the refiner to measure different operating conditions of the refiner. A first control system coupled to the plurality of measurement units is also provided, and is configured to receive a plurality of operation conditions of the refiner from the plurality of measurement units. The fiber processing system further includes a processing unit coupled to the control system and configured to estimate a production disturbance and a feed consistency disturbance of the refiner based on the plurality of operation conditions. A second control system coupled to the processing unit is additionally provided, and is configured to generate a target operating condition based on the production disturbance and the feed consistency disturbance, wherein the first control system is further configured to control an operation of the refiner based on the target operating condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
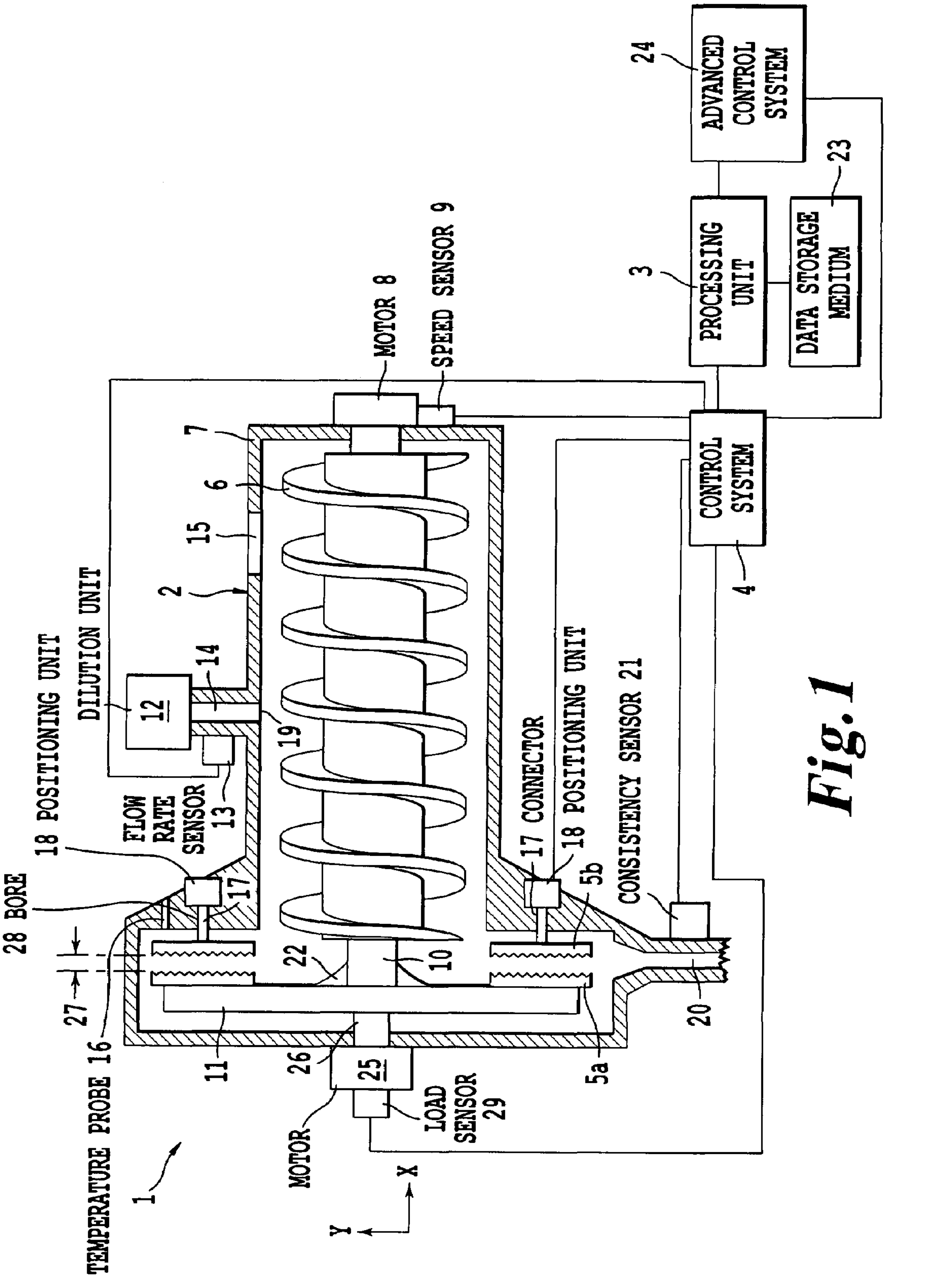
FIG. 1 is a schematic view of a fiber processing system in accordance with an aspect of the present invention.

Referring now to the drawings, wherein like reference numerals designate identical or corresponding parts throughout the several views.

FIG. 1 illustrates a fiber processing system 1, which can be used in a TMP process, refiner-mechanical pulping, chemithermo-mechanical pulping, or another type of pulping or fiber processing. The fiber processing system 1 includes a refiner 2, which is illustrated as a double-disc refiner including a refiner plate 5*a* and a refiner plate 5*b*, but can be alternatively configured as a counter-rotating refiner, a CD refiner, or any other type of rotary-type refiner used in fiber processing. Further, the refiner 2 is illustrated as a primary refiner, which includes a feed screw, but aspects of the present invention can also be applied to secondary, tertiary, and reject refiners. Also, the illustrated refiner 2 includes one pair of refiner plates and one feed screw, but the refiner 2 can alternatively include more than one pair of refiner plates and more than one feed screw.

The refiner 2 includes a housing 7 and a feed screw 6, which is configured to deliver a feed stock (e.g., a slurry of water and fiber) introduced through an inlet 15 of the housing 7 to the refiner plates 5*a* and 5*b*. The feed screw 6 can be arranged as an auger screw or any other type of rotating component that can deliver slurry stock in a linear direction. The housing 7 supports a rotating shaft 10, which in turn supports the feed screw 6. The rotation of the shaft 10 is controlled by a motor 8, which is arranged as a electrical rotational motor, but can alternatively arranged as any other type of continuous, rotational actuator. The speed of the shaft 10 during rotation is detected by a speed sensor 9, which can be coupled to the motor 8 or to the shaft 10. The speed sensor 9 can be arranged as a contactless telemetry unit or any other speed sensing device known in the art.

The refiner 2 includes a shaft 26, which is supported by the housing and is arranged concentrically to the shaft 10. Rotation of the shaft 26 is independent of that of the shaft 10 and is controlled by a motor 25, which is arranged as a electrical rotational motor, but can alternatively arranged as any other type of continuous, rotational actuator. The load on the motor 25 is monitored by a motor load sensor 29, which is positioned at the motor 25, but can alternatively be positioned at any position along the shaft 26. The load on the motor 25 can be measured in units of power (e.g., megawatts) or units of force. During operation of the refiner 2, the load on the motor 25 can vary greatly over time depending on many parameters, as discussed above. For example, as the mass flow rate of the stock being introduced through the inlet 15 increases, the load on the motor 25 increases. Also, a change in the consistency of the stock when fed through the inlet 15 can affect the load on the motor 25.

A rotor 11 is fixedly attached to the shaft 26 and thus rotates with the shaft 26. The rotor 11 can be configured as a disc-shaped component or any other shape suitable for rotation. Mounted on the rotor 11 is the refiner plate 5*a*, which can be configured as any known refining component including a surface having numerous refining bars or ridges.

Positioned opposite of the refiner plate 5*a* is the refiner plate 5*b*, which is fixedly attached to the housing 7 by connectors 17. In this way, when the rotor 11 is rotated by the shaft 26, relative motion is created between the refiner plate 5*a* and the refiner plate 5*b*. This relative motion causes fibrous feed stock to be fibrillated as the stock passes radially outwardly (i.e., away from the feed screw 6) between the refiner plates 5*a* and 5*b*. Alternatively, the refiner plate 5*b* can be mounted onto another rotor (i.e., other than the rotor 11) that rotates in the opposite direction of the rotor 11, thus creating a counter-rotating disc configuration.

The connectors 17 are arranged within bores 28 of the housing and support the refiner plate 5*b*. The connectors 17 also allow the refiner plate 5*b* to be moved relative to the housing 7 along the x-axis of FIG. 1 by using threaded surfaces, pneumatics, hydraulics, or any other type of controlled, precision movement. For example, the connectors 17 can each be arranged as a threaded rod, a smooth rod, or any other type of component that is capable of supporting the refiner plate 5*b* while allowing linear translation of the refiner plate 5*b* along the x-axis shown in FIG. 1. Positioning of the refiner plate 5*b* via the connectors 17 is controlled by positioning units 18, which are coupled to the connectors 17. The positioning units 18 can be arranged as linear actuators, rotational actuators, or any other type of actuators capable of affect linear translation of the plate 5*b* via the connectors 17. Also, the positioning units 18 can be alternatively arranged as a single positioning unit. By moving the refiner plate 5*b* relative to the housing 7 along the x-axis, a plate gap 27 between the refiner plate 5*a* and the refiner plate 5*b* can be adjusted. The instantaneous plate gap 27 can be determined by the positioning units 18 (e.g., by direct sensing or calculation) or by a separate sensing unit arranged to measure a space between two object, e.g., an optical sensor.

Further, the refiner 2 can include multiple connectors 17, as shown in FIG. 1, or can alternatively include only one connector 17. In addition, the plate gap 27 can be adjusted by moving the rotor 11 along the x-axis shown in the FIG. 1 alternatively or additionally to movement of the refiner plate 5*b*. For example, the motor 25 can include a linear actuator configured to selectively reposition the rotor 11 along the shaft 26.

Alternative to the configuration shown in FIG. 1, the shafts 10 and 26 can be arranged to be integral or coupled to another, such that the rotor 11 and the feed screw 6 are originally powered by a single motor (e.g., either motor 8 or motor 25). In this alternative arrangement, at least one of the feed screw 6 and the rotor 11 is coupled to a power transmission system, such as a gearbox, which allows adjustment of rotational speed of the feed screw 6 independent of the rotor 11, or vice versa.

A dilution unit 12 is provided to deliver water, or another type of diluting fluid, to the refiner 2 via a conduit 14 and an inlet 19. The dilution unit 12 can include a water storage tank and a solenoid-controlled valve, or can alternatively be arranged as any other type of device that can selectively provide water or another type of dilution fluid to interior of the housing 7. During operation of the refiner 2, heat is produced in a refining zone between the refiner plates 5*a* and 5*b*, which may lead to the production of steam. This production significantly reduces the amount of liquid in the refining zone, which leads to increased friction between the refiner plates 5*a* and 5*b*. The increased friction, in turn, increases the load on the motor 25. When it becomes necessary to decrease this friction (i.e., to lower the load on the motor 25), dilution water is added to the refiner by the dilution unit 12. The rate of water delivery, measured in units of mass-over-time, is detected by a flow rate sensor 13, which is positioned at a portion of the conduit 14. The conduit 14 can be alternatively configured to deliver water through the inlet 15, instead of through the inlet 19, or at another position of the refiner 2 that provides for proper dilution of feed stock.

Consistency of fibrous stock is defined as the ratio of fibrous matter to the combination of the fibrous matter and water. Feed consistency of the refiner 2 is defined as the consistency of the stock at the inlet 15, that is, before the refiner 2 applies energy to the fibrous matter. In contrast, refiner consistency of the refiner 2 is defined as the consistency of stock after the refiner 2 has applied energy to the feed stock in one form or another, e.g., by adding dilution water to the stock and by processing the stock with the refiner plates 5*a* and 5*b*. While no known system is capable of directly measuring a feed consistency of a refiner, refiner consistency can be measured in at least one of two ways: temperature probes and near-IR sensors. For example, the refiner 2 includes temperature probes 16 and/or a consistency sensor 21. The temperature probes 16 are shown to be positioned at the refiner plate 5*b*, but can alternatively or additionally be positioned at the refiner plate 5*a* or anywhere else within the housing 7. Before operation of the refiner 2, the temperature probes 16 are calibrated such that detected temperatures of the feed stock can be used to calculate actual refiner consistency of the feed stock (e.g., by reference to a calibration curve). The consistency sensor 21 is arranged as a device that infers a moisture level in feed stock by making a measurement in the near-IR frequency range at a blow line 20. The consistency sensor 21 is also calibrated before operation of the refiner 2, and an actual refiner consistency can be determined based on a calibration curve. The refiner 2 can also alternatively or additionally include any other device arranged to detect refiner consistency, either directly or indirectly.

During operation of the refiner 2, a feed stock is introduced through the inlet 15. The feed screw 6, by rotation of the shaft 10, delivers the feed stock in the -x direction towards the refiner plates 5*a* and 5*b*. Water is provided to the refiner 2 from the dilution unit 12 as necessary to adjust the consistency of the feed stock. The refiner 2 includes a baffle 22, which is configured to direct stock fed by the feed screw radially towards the refiner plates 5*a* and 5*b*. The baffle 22 can be mounted on the shaft 10, the shaft 26, or the rotor 11.

When the feed stock arrives at the refiner plates 5*a* and 5*b*, the relative motion created by the rotating shaft 26 and the rotor 11 between the ridged surfaces of the refiner plates 5*a* and 5*b* refines the feed stock. The refined feed stock is then delivered to a downstream device through the blow line 20.

Performance of the refiner 2 can be affected by different disturbances, none of which are directly measurable by known systems, as discussed above. However, it has been found that the relative response of the refiner consistency and refiner motor load measurements to production and feed consistency disturbances is significantly different. Consequently, once estimates of the relative responses are obtained via process response tests and theoretical models, the production and feed consistency disturbances can be back-calculated based on the refiner motor load and refiner consistency measurements. A feed water disturbance can further be calculated based on estimated production and feed consistency disturbances. In this way, by applying process response tests and theoretical models, measured refiner parameters can be used to estimate production and feed consistency disturbances, which can then be used to control operation of a refiner and/or produce prediction and historical data.

To estimate the disturbances in the refiner 2 and to control the refiner 2 based on the estimated disturbances, the fiber processing system 1 includes a control system 4, a processing unit 3, and an advanced control system 24, which are shown in FIG. 1 to be separate units, but can alternatively be integrally formed in any combination.

The control system 4 can be configured as a known DCS or any other type of system that can monitor various parameters (also referred to as "operating conditions") of the refiner 2 and affect changes to the operation of the refiner 2 via command signals. Specifically, the control system 4 is arranged to receive a mass flow rate of dilution water from the flow rate sensor 13, a motor load from the motor load sensor 29, a feed screw speed from the speed sensor 9, a plate gap from the positioning unit 18, and a refiner consistency from the temperature probes 16 or the consistency sensor 21. The control system 4 can further be arranged to receive refiner parameters additional to those listed above. The control system 4 and the various sensing units of the refiners can be configured to communicate with one another via physical lines or via wireless technology, including, but not limited to, radio-frequency or infrared communication.

The processing unit 3 can be configured as a microprocessor or any other known digital processing device. The processing unit 3 is arranged to receive measured refiner parameters from the control system 4, either through a physical line or wirelessly, and is arranged to estimate production and feed consistency disturbances based in part on these measurements. Further, the processing unit 3 can be configured as a unit fixed in the fiber processing system 1 or as a portable unit (e.g., a hand-held device).

Figure 2:
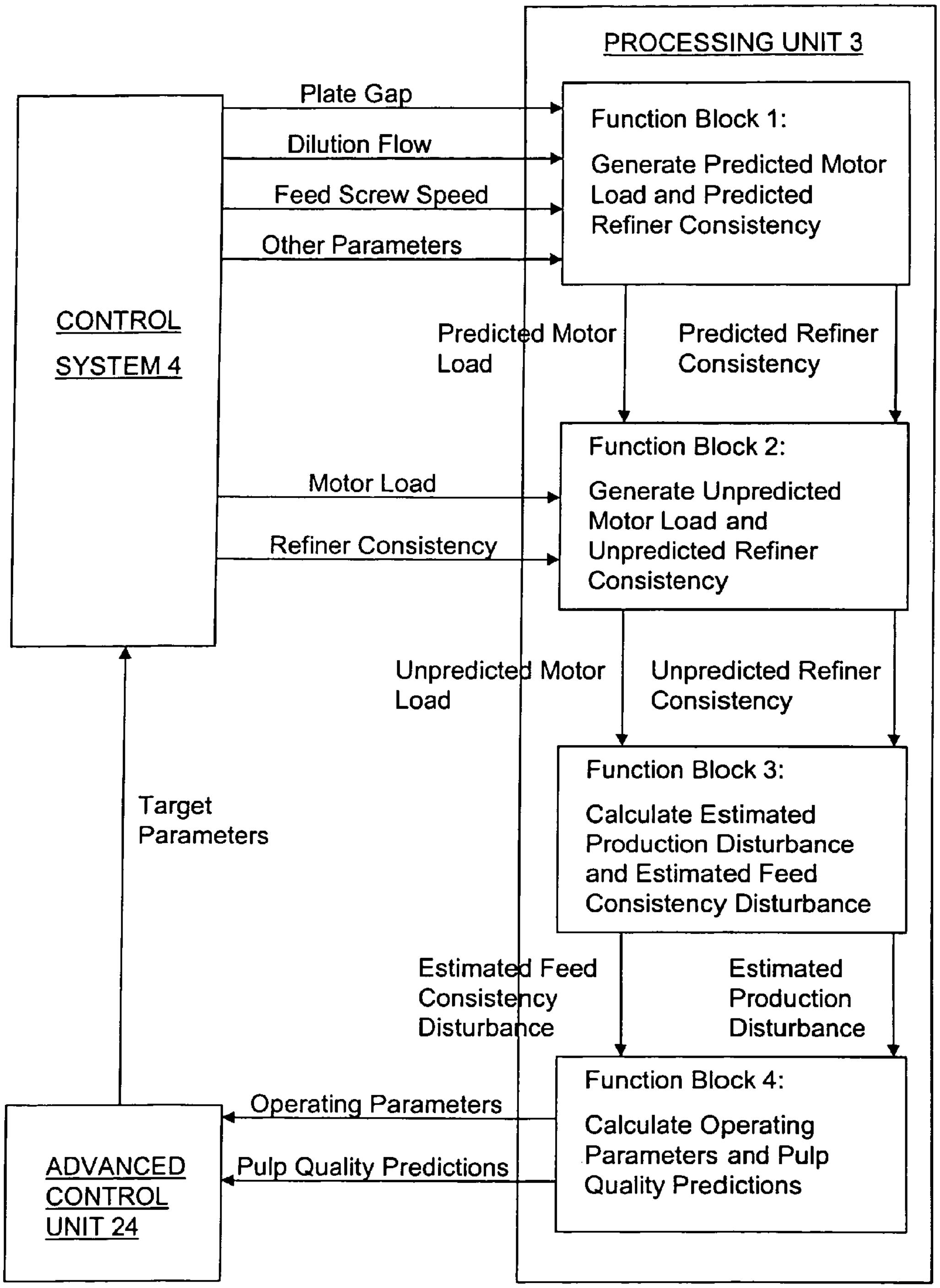
FIG. 2 is a function diagram of a control system, a processing unit, and an advanced control system of FIG. 1.

FIG. 2 illustrates a functional representation of the processing unit 3, which performs the illustrated function blocks based on computer code instructions stored in a data storage medium 23, shown in FIG. 1. The computer code instructions can be written in any known computer language that can affect the processing unit 3 to perform the below-described functions. Alternative to the illustration, the data storage medium 23 can be positioned within the processing unit 3 or in any other component of the fiber processing system 1. Also, the data storage medium 23 can be arranged as a removable storage medium (e.g., an optical disk or portable solid-state memory device) or any other type of data storage medium known in the art.

In the mathematical relationships applied by the processing unit 3 in the different function blocks to determine or estimate various characteristics of the refiner 2, the term "delta" is used to indicates a change in a particular operating condition or parameter. However, for purposes of simplifying the understanding of the present invention, the terms "delta" and "change in" are not used in describing the present invention outside of the illustrated mathematical relationships. That is, for example, "a predicted motor load" is used interchangeably with "a predicted change in motor load" in this disclosure. It is to be understood that the present invention can be implemented with absolute values (e.g., an instantaneous motor load of the refiner 2) instead of, or in addition to, relative values (e.g., a change in the motor load relative to a previous motor load measurement).

In function block 1, the processing unit 3 receives from the control system 4 multiple operating conditions of the refiner 2. These operating conditions can be received on a periodic basis during operation of the refiner 2 (e.g., in thirty second intervals) or upon a user command via a user interface included in the control system 4, the processing unit 3, or the advanced control system 24. The operating conditions can include the plate gap 27 determined or sensed by the positioning unit 18, the flow rate of dilution water measured by the flow rate sensor 13, the feed screw speed measured by the speed sensor 9, and other parameters, such as a wood type of the stock. The fiber processing system 1 can also be configured such that refiner parameters additional or alternative to the plate gap 27, the flow rate of dilution water from the dilution unit 12, and the speed of feed screw 6 are sent from the control system 4 to the processing unit 3.

Figure 3:
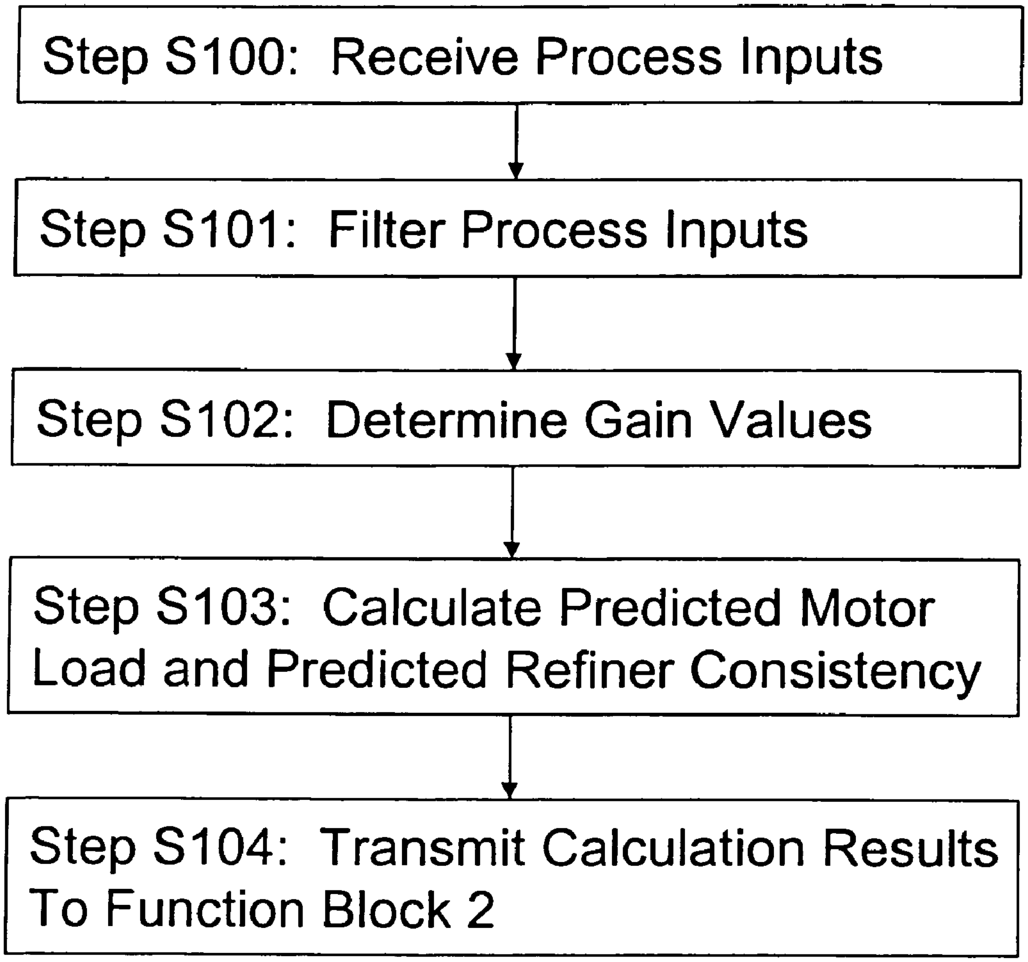
FIG. 3 is a flowchart illustrating the steps performed by a first function block of the processing unit of FIG. 1.

FIG. 3 illustrates the steps performed in the function block 1 of the processing unit 3. Function block 1 performs the overall function of generating a predicted motor load and a predicted refiner consistency.

In step S100, the processing unit 3 receives from the control system 4 data signals representing various operating conditions or parameters of the refiner 2. These conditions or parameters are also referred to as "process inputs" and may include high frequency noise when received by the processing unit 3. Thus, the function block 1 performs step S101, which filters the process inputs to remove any high frequency noise.

In step S102, the function block 1 determines gain values to be used in calculating the predicted motor load and the predicted refiner consistency. These gain values can be obtained by applying instantaneous characteristics of the refiner 2 to actual process response tests performed on the fiber processing system 1 and/or to theoretical models. For example, mathematical relationships for determining gain values can be stored in the data storage medium 23 or in any other storage medium of the control system 4, processing unit 3, or the advanced control system 24. These gain relationships can be determined before actual operation of the refiner 2 in multiple process response tests, in which various operating conditions of the refiner 2 are changed to produce different sets of cause-and-effect relationships. Alternatively or additionally, gain relationships can be obtained by using theoretical software models of fiber refiners. The obtained gain values can vary based on different refiner parameters, such as production rate of the refiner 2 and load on the motor 25.

The function block 1 calculates the predicted motor load and the predicted refiner consistency in step S103. The predicted motor load is determined by the following formula:

$$\text{delta\_motor\_load}_{predicted}=\text{delta\_input1}*\text{gain1}_{ml}+\text{delta\_input2}*\text{gain2}_{ml}+\text{delta\_input3}*\text{gain3}_{ml}+\ldots,$$

where $\text{delta\_motor\_load}_{predicted}$ is the predicted motor load in units of power, and where input1, input2, and input3 are different process inputs, such as the plate gap 27, the flow rate of dilution water from the dilution unit 12, and the speed of the feed screw 6. The $\text{gain}\mathbf{1}_{ml}$, $\text{gain}\mathbf{2}_{ml}$, and $\text{gain}_{ml}$ represent the gain values associated with motor load determined in step S102. The predicted refiner consistency is determined by the following formula:

$$\text{delta\_consistency}_{predicted}=\text{delta\_input1}*\text{gain1}_{cons}+\text{delta\_input2}*\text{gain2}_{cons}+\text{delta\_input3}*\text{gain3}_{cons}+\ldots,$$

where $\text{delta\_consistency}_{predicted}$ is the predicted refiner consistency in percentage units, and where input1, input2, and input3 are different process inputs, such as the plate gap 27, the flow rate of dilution water from the dilution unit 12, and the speed of the feed screw 6. The $\text{gain}\mathbf{1}_{cons}$, $\text{gain}\mathbf{2}_{cons}$, and $\text{gain}\mathbf{3}_{cons}$ represent the gain values associated with refiner consistency, also determined in step S102.

Figure 4:
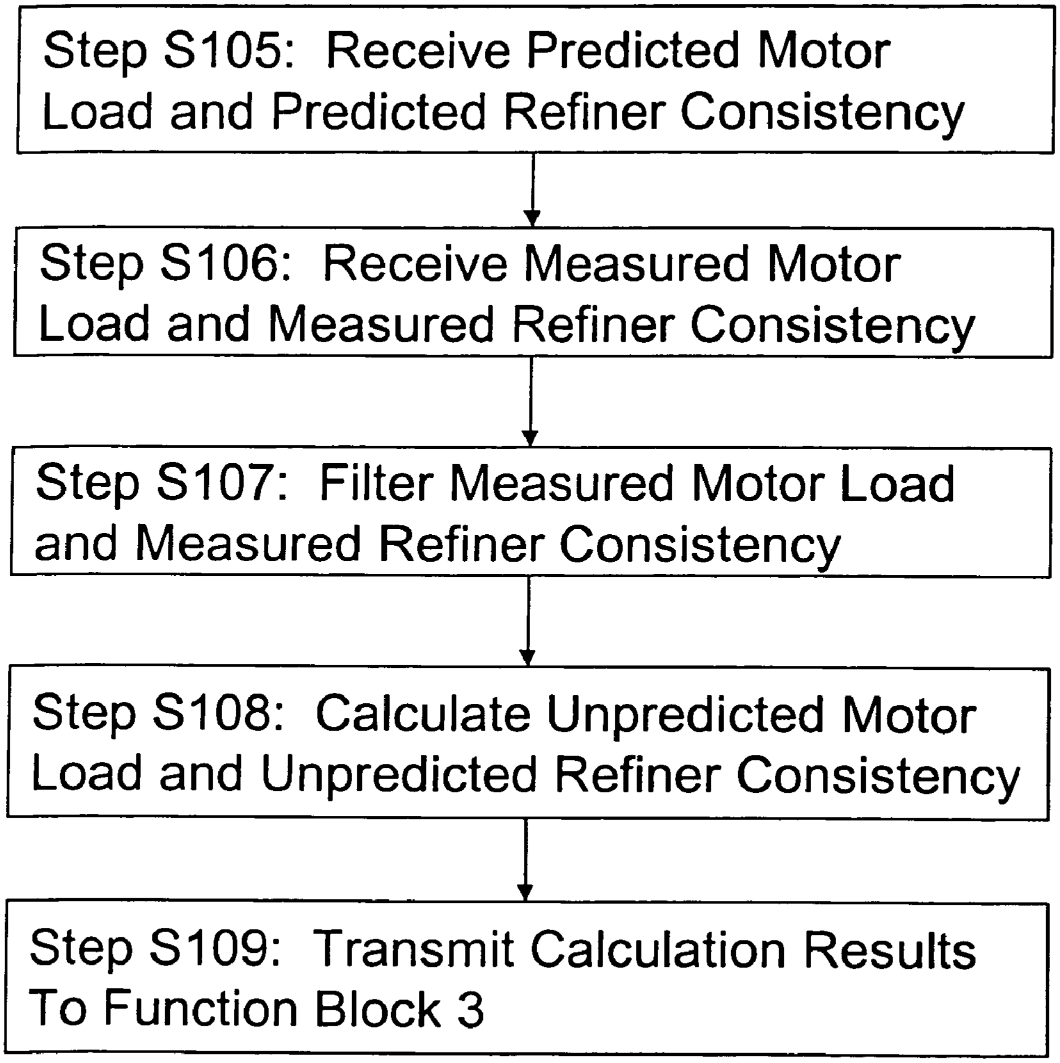
FIG. 4 is a flowchart illustrating the steps performed by a second function block of the processing unit of FIG. 1.

In step S104, the predicted motor load and the predicted refiner consistency are then transferred to the function block 2. Since motor load and refiner consistency in the refiner 2 is affected by variables such as refiner plate gap, refiner dilution, and refiner feed screw speed, predicted motor load and consistency responses to these variables should be subtracted from actual motor load and consistency measurements before the production and feed consistency disturbances are back-calculated. As such, the function block 2 generates an unpredicted motor load and an unpredicted refiner consistency based on the predicted motor load and the predicted refiner consistency. FIG. 4 illustrates the steps performed by the function block 2.

In step S105, the function block 2 receives the predicted motor load and the predicted refiner consistency from the function block 1. In step S106, the function block 2 receives a measured motor load and a measured refiner consistency from the control system 4. While the predicted motor load is calculated from variables other than an actual refiner motor load, the measured motor load is the actual motor load measured by the motor load sensor 29. Similarly, while the predicted refiner consistency is calculated from variables other than an actual refiner consistency, the measured refiner consistency is the actual refiner consistency measured by the temperature probes 16 and/or by the consistency sensor 21. In step S107, the function block 2 filters the received measured motor load and measured refiner consistency to remove any high frequency noise.

In step S108, the function block 2 calculates the unpredicted motor load according to the following formula:

$$\text{delta\_motor\_load}_{unpredicted}=\text{delta\_motor\_load}_{measured}-\text{delta\_motor\_load}_{predicted},$$

where $\text{delta\_motor\_load}_{unpredicted}$ is the unpredicted motor load in units of power, and where $\text{delta\_motor\_load}_{measured}$ is the actual load on the motor 25, as measured by the sensor 29. The unpredicted refiner consistency is calculated by the function block 2 according to the following formula:

$$\text{delta\_consistency}_{unpredicted}=\text{delta\_consistency}_{measured}-\text{delta\_consistency}_{predicted},$$

where $\text{delta\_consistency}_{unpredicted}$ is the unpredicted refiner consistency in percentage units, and where $\text{delta\_consistency}_{measured}$ is the actual refiner consistency measured by the temperature probes 16 and/or by the consistency sensor 21. Thus, these unpredicted values are determined by subtracting the predicted values from the actual measured values. The unpredicted motor load and the unpredicted refiner consistency are then transferred to the function block 3 in step S109.

Figure 5:
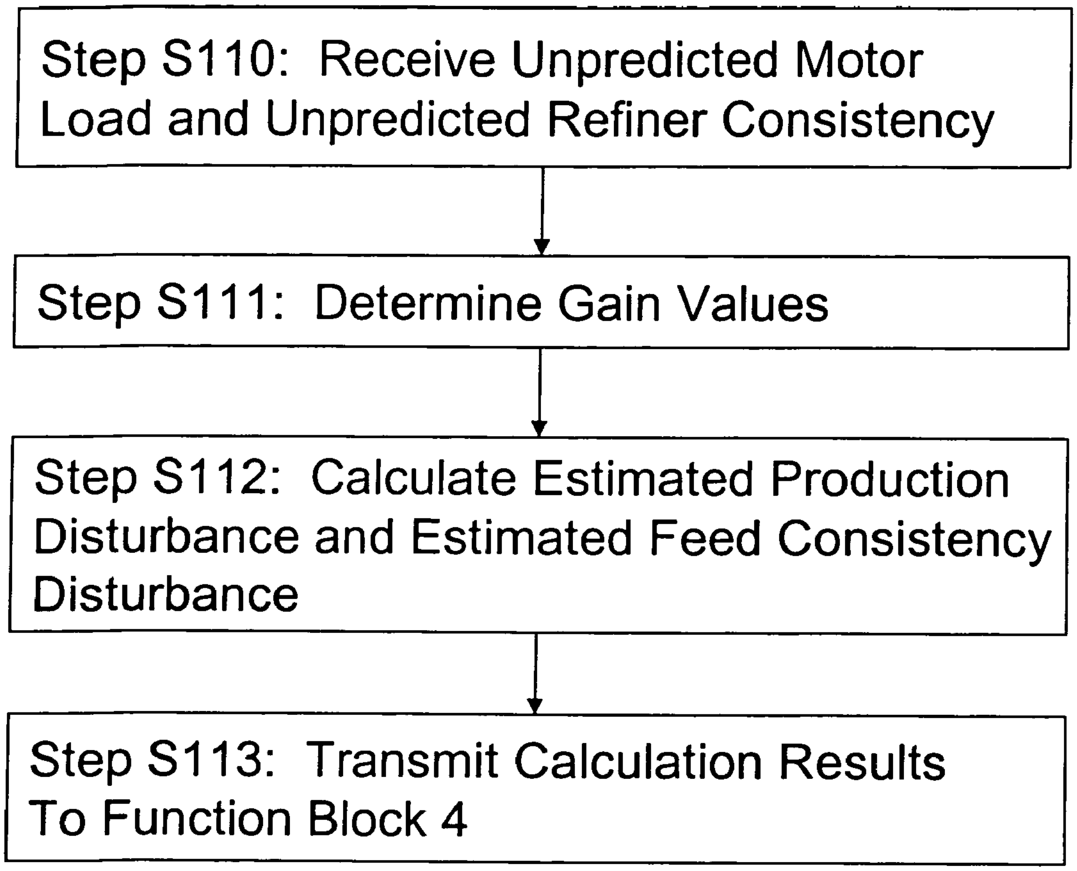
FIG. 5 is a flowchart illustrating the steps performed by a third function block of the processing unit of FIG. 1.

Function block 3 of the processing unit 3 estimates a production disturbance and a feed consistency disturbance based on the unpredicted motor load and the unpredicted refiner consistency. FIG. 5 illustrates the steps performed by the function block 3.

In step S110, the function block 3 receives from the function block 2 the unpredicted motor load and the unpredicted refiner consistency and, in step S111, the function block 3 determines the associated gain values used to calculate the estimated production disturbance and the estimated feed consistency disturbance. As with the gain values obtained in step S102, the gain values obtained in step S111 can be generated by applying instantaneous characteristics of the refiner 2 to actual process response tests and/or to theoretical models, which can be stored in the data storage medium 23 or in any other storage medium of the control system 4, processing unit 3, or the advanced control system 24.

The estimated feed consistency disturbance is calculated in step S112 according to the following formula:

$$\text{feed\_consistency}_{disturbance}=[\text{delta\_consistency}_{unpredicted}-\text{delta\_motor\_load}_{unpredicted}*(\text{gain3}/\text{gain1})]/[\text{gain4}-(\text{gain2}*\text{gain3}/\text{gain1})],$$

where $\text{feed\_consistency}_{disturbance}$ is the estimated feed consistency disturbance in percentage units. The estimated production disturbance is calculated in step S112 according to the following formula:

$$\text{production}_{disturbance}=[\text{delta\_motor\_load}_{unpredicted}-\text{feed\_consistency}_{disturbance}*\text{gain2}]/\text{gain1},$$

where $\text{production}_{disturbance}$ is the estimated production disturbance in units of power, and where $\text{feed\_consistency}_{disturbance}$ is the estimated feed consistency disturbance.

"Gain1" represents a production-to-motor load gain, which is based on process response tests related to feed screw speed. "Gain2" represents a feed consistency-to-motor load gain, which is based on process response tests related to dilution. "Gain3" represents a production-to-refiner gain, which is based on process response tests related to feed screw speed. "Gain4" represents a feed consistency-to-refiner consistency gain, which is based on process response tests related to dilution. Thus, the estimated feed consistency disturbance is calculated based on both the unpredicted motor load and the unpredicted refiner consistency, and the estimated production disturbance is calculated based on the estimated feed consistency disturbance and the unpredicted motor load.

Moreover, in addition to the above calculations, the function block 4 can perform additional calculations to determine another type of disturbance, such as a feed water disturbance, based on the estimated production and/or feed consistency disturbances or based on any measured parameter of the refiner 2.

The estimated feed consistency disturbance and the estimated production disturbance are then transferred by the function block 3 in step S113 to the function block 4, which can alternatively be performed in the advanced control system 24. The steps performed by the function block 4 are illustrated in FIG. 6.

Figure 6:
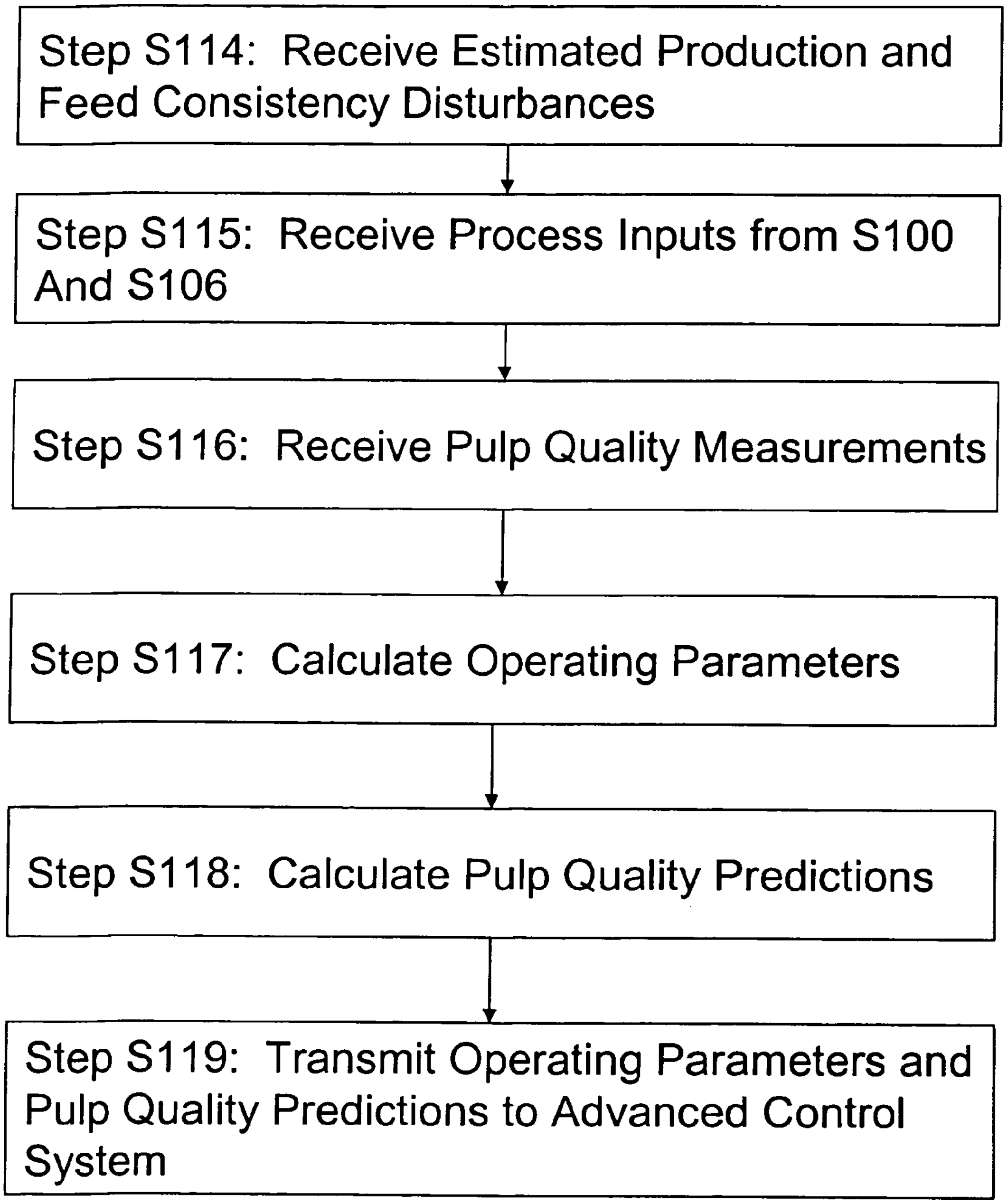
FIG. 6 is a flowchart illustrating the steps performing by a fourth function block of the processing unit of FIG. 1.

In step S114 in FIG. 6, the function block 4 receives from the function block 3 the estimated production and feed consistency disturbances. In step S115, the function block 4 also receives the various parameters collected in steps S100 and S106, including, for example, the load on the motor 25 and the measured refiner consistency (e.g., from the consistency sensor 21). Pulp quality measurements are received in step S116, and these measurements can be made in post-processing lab examinations and/or by on-line quality sensors.

Using the received information, the function block 4 can generate updated operating parameters and pulp quality predictions associated with the refiner 2. In step S117, the function block 4 calculates operating parameters, including a specific energy and a refining intensity of the refiner 2. In step S118, the function block 4 determines updated pulp quality predictions related to, but not limited to, freeness, fiber length/fiber fractions, shive, handsheet properties, or any other properties related to processed pulp. The updated operating parameters and pulp quality predictions are then transmitted to the advanced control system 24 in step S119.

The advanced control system 24 can be arranged as a microprocessor or any other known digital processing device, and, as discussed above, can be integrally arranged with the control system 4 and/or the processing unit 3. Based on the updated operating parameters and pulp quality predictions, the advanced control system 24 prepares target parameters for transmission to the control system 4. For example, if the updated operating parameters and pulp quality predictions indicate that a plate gap of "x" will result in a desired refiner specific energy of "y" and a desired freeness value of "z", the advanced control system 24 can transmit a plate gap setpoint of "x" to the control system 4 as a target parameter. The control system 4 can then use the target parameter to adjust the plate gap 27 of the refiner 2 to be the distance "x". This process can be used and periodically repeated for all of the various control points of the refiner 2 to maintain desired quality levels in feed stock processed by the refiner 2.

Based on the estimated production and feed consistency disturbances, the advanced control system 24, the processing unit 3, or the control system 4 can produce trend graphs on a user display that is located within or remotely from the fiber processing system 1. By illustrating estimated disturbances along with, for example, measured parameters, trend graphs can visually update an operator of the fiber processing system 1 as to the status of refiner operation.

In this way, the present invention presents a novel system and method for improving the performance of a refiner, by estimating production and feed consistency disturbances that can be used to correctly adjust operation of the refiner.

Numerous modifications and variations of the present invention are possible in light of the above teachings. For example, the illustrated process steps from FIG. 2 to FIG. 6 can be performed in an order alternative to that shown, and some of the illustrated steps can be alternatively performed in parallel. Also, it is to be understood that, in practicing the invention, subsets of the features or steps of the illustrated and described embodiments could be used without practicing each and every feature of the disclosed examples. It is therefore to be understood that within the scope of the appended claims, the invention may be practiced otherwise than as specifically described herein.

The invention claimed is:

1. A method for estimating disturbances in a refiner, comprising:

measuring during an actual operation of the refiner a first operating condition and a second operating condition of the refiner, said refiner having refiner plates configured to apply a rotational abrasive fibrillating force to a fibrous material passing through the refiner plates;

generating a predicted first operating condition and a predicted second operating condition which is different from the predicted first operating condition;

comparing during said actual operation of the refiner the measured first operating condition to the predicted first operating condition to determine an unpredicted first operating condition;

comparing during said actual operation of the refiner the measured second operating condition to the predicted second operation condition to determine an unpredicted second operating condition;

estimating during the actual operation of the refiner a first disturbance in the refiner based on a first weighted sum of the unpredicted first and second operating conditions; and providing a control signal for the refiner based on the estimated first disturbance.

2. The method of claim 1, wherein, the first operating condition is a motor load, the predicted first operating condition is a predicted motor load, the second operating condition is a refiner consistency, and the predicted second operating condition is a predicted refiner consistency.

3. The method of claim 1, further comprising:

filtering at least one of the first operating condition and the second operating condition to remove high frequency noise.

4. The method of claim 1, further comprising:

calculating at least one of an updated operating parameter and a pulp quality prediction of the refiner based on the first disturbance.

5. The method of claim 2, wherein, the predicted first and second operating conditions are generated from a set of process inputs including at least one of a plate gap, a dilution flow rate, and a feed screw speed.

6. The method of claim 4, wherein the calculating includes calculating at least one of a specific energy of the refiner and a refining intensity of the refiner based on the first disturbance.

7. The method of claim 4, wherein the calculating includes calculating at least one of freeness, fiber length, fiber fractions, shive, and handsheet properties based on the first disturbance.

8. The method of claim 4, further comprising:

determining a target operating condition of the refiner based on the calculating of at least one of the updated operating parameter and the pulp quality prediction.

9. The method of claim 8, further comprising:

adjusting an operation of the refiner based on the determining of the target operating condition.

10. The method of claim 5, further comprising:

estimating during the actual operation of the refiner a second disturbance based on a second weighted sum of the first disturbance and the unpredicted second operating condition; and providing a control signal for the refiner based on the estimated second disturbance.

11. The method of claim 5, wherein, the generating includes, determining predetermined gain values, and generating the predicted first and second operating conditions based on the predetermined gain values and the set of process inputs.

12. The method of claim 5, wherein, the estimated first disturbance is a feed consistency disturbance associated with a consistency of stock fed into the refiner, and the estimated second disturbance is a production disturbance associated with an on-line throughput of the refiner.

13. The method of claim 11, wherein, the determining including referring to at least one of a process response test result and a theoretical process model.

14. A method for estimating disturbances in a refiner, comprising:

generating a predicted motor load and a predicted refiner consistency, said refiner having refiner plates configured to apply a rotational abrasive fibrillating force to a fibrous material passing through the refiner plates;

measuring during an actual operation of the refiner a first motor load and a first refiner consistency;

determining an unpredicted second motor load based on the predicted motor load and the measured first motor load;

determining an unpredicted second refiner consistency based on the predicted refiner consistency and the measured first refiner consistency;

estimating during said actual operation of the refiner the disturbances based on the unpredicted second motor load and the predicted second refiner consistency; and providing control signals for the refiner based on the estimated disturbances.

15. The method of claim 14, wherein, the disturbances include a feed consistency disturbance and a production disturbance, and the estimating includes, estimating a feed consistency disturbance based on a first weighted sum of the unpredicted second motor load and the unpredicted second refiner consistency, and estimating a production disturbance based on a second weighted sum of the feed consistency disturbance and the unpredicted second motor load.

16. The method of claim 14, wherein generating the predicted motor load and the predicted refiner consistency includes multiplying at least one process input with at least one predetermined gain value.

17. The method of claim 14, wherein the measuring of the first refiner consistency includes performing a near-IR measurement in a blow line of the refiner.

18. The method of claim 14, wherein the measuring of the first refiner consistency includes measuring a temperature at a refiner plate of the refiner.

19. The method of claim 14, wherein the determining of the unpredicted second motor load includes calculating a difference between the predicted motor load from the first motor load.

20. The method of claim 14, wherein the determining of the unpredicted second refiner consistency includes calculating a difference between the predicted refiner consistency and the first refiner consistency.

21. The method of claim 14, further comprising:

filtering a measurement of the first refinery consistency to remove high frequency noise.

22. The method of claim 14, wherein the estimating includes calculating an estimated feed consistency disturbance based on the unpredicted second motor load, the unpredicted second refiner consistency, a production-to-motor load gain, a feed consistency-to-motor load gain, a production-to-refiner consistency gain, and a feed consistency-to-refiner consistency gain.

23. The method of claim 14, wherein the estimating includes calculating an estimated production disturbance based on the unpredicted second motor load, the estimated feed consistency, a production-to-motor load gain, and a feed consistency-to-motor load gain.

24. The method of claim 16, further comprising:

measuring the at least one process input, wherein the at least one process input includes at least one of a plate gap, a dilution fluid flow rate, and a feed screw speed.

25. The method of claim 16, further comprising:

determining the at least one predetermined gain value by referring to at least one of a process response test result and a theoretical process model.

26. The method of claim 16, wherein the at least one predetermined gain value is determined based on at least one of a refiner production rate and the first motor load.

27. The method of claim 16, wherein the generating of the predicted motor load includes summing a product of a first process input and a first motor load gain value with a product of a second process input and a second motor load gain value.

28. The method of claim 16, wherein the generating of the predicted refiner consistency includes summing a product of a first process input and a first consistency gain value with a product of a second process input and a second consistency gain value.

29. The method of claim 19, further comprising:

filtering a measurement of the first motor load to remove high frequency noise.

30. The method of claim 27, wherein, the first process input is one of a plate gap, a dilution fluid flow rate, and a feed screw speed, and the second process input is another one of the plate gap, the dilution fluid flow rate, and the feed screw speed.

31. The method of claim 27, further comprising:

filtering at least one of the first process input and the second process input to remove high frequency noise.

32. The method of claim 28, wherein, the first process input is one of a plate gap, a dilution fluid flow rate, and a feed screw speed, and the second process input is another one of the plate gap, the dilution flow, and the feed screw speed.

33. The method of claim 28, further comprising:

filtering at least one of the first process input and the second process input to remove high frequency noise.

34. A computer program product comprising a computer usable medium having computer readable program code embodied in the computer usable medium that, when executed, causes a computer to:

retrieve during an actual operation of the refiner a first operating condition and a second operating condition of a refiner, said refiner having refiner plates configured to apply a rotational abrasive fibrillating force to a fibrous material passing through the refiner plates;

generate a predicted first operating condition and a predicted second operating condition which is different from the predicted first operating condition;

compare during said actual operation of the refiner the measured first operating condition to the predicted first operating condition to determine an unpredicted first operating condition;

compare during said actual operation of the refiner the measured second operating condition to the predicted second operation condition to determine an unpredicted second operating conditions;

estimate during the actual operation of the refiner a first disturbance in the refiner based on a weighted sum of the unpredicted first and second operating conditions; and provide a control signal for the refiner based on the estimated first disturbance.

35. The computer program product of claim 34, wherein, the first operating condition is a motor load, the predicted first operating condition is a predicted motor load, the second operating condition is a refiner consistency, the predicted second operating condition is a predicted refiner consistency.

36. The computer program product of claim 34, in combination with, a refiner configured to process fibrous matter, a control system coupled to the refiner and configured to monitor and control the refiner, and a processing unit coupled to the control system and configured to receive measured operating conditions of the refiner from the control system.

37. The computer program product of claim 35, wherein, the first and second operating conditions are generated from a set of process inputs including at least one of a plate gap, a dilution flow rate, and a feed screw speed.

38. The computer program product of claim 37, wherein the computer readable program code, when executed, further causes the computer to estimate a second disturbance based on a second weighted sum of the first disturbance and the unpredicted second operating condition; and to provide a control signal for the refiner based on the estimated second disturbance.

39. The computer program product of claim 38, wherein, the estimated first disturbance is a feed consistency disturbance associated with a consistency of stock fed into the refiner, and the estimated second disturbance is a production disturbance associated with an on-line throughput of the refiner.

40. A system for estimating disturbances in a refiner, comprising:

means for receiving during an actual operation of the refiner a first operating condition and a second operating condition of the refiner, having refiner plates configured to apply a rotational abrasive fibrillating force to a fibrous material passing through the refiner plates;

means for generating a predicted first operating condition and a predicted second operating condition of the refiner;

means for comparing during said actual operation of the refiner the measured first operating condition to the predicted first operating condition which is different from the first operating condition to determine an unpredicted first operating condition, and for comparing the measured second operating condition to the predicted second operating condition which was predicted from the second operating condition to determine an unpredicted second operating conditions;

means for calculating disturbances in the refiner during said actual operation of the refiner based on, a comparison based on a first weighted sum of the unpredicted first and second operating conditions.

41. The system of claim 40, further comprising:

means for transferring the estimated disturbances to a control system configured to control the refiner.

42. The system of claim 40, further comprising:

a storage medium including a computer readable program code that, when executed, causes, the means for generating to generate the predicted first operating condition and the predicted second operating condition of the refiner, the means for comparing to compare the first operating condition to the predicted first operating condition, and to compare the second operating condition to the predicted second operating condition, and the means for calculating to calculate the disturbances in the refiner based on, the comparison between the first operating condition and the predicted first operating condition, and the comparison between the second operating condition and the predicted second operating condition.

43. A system for controlling a refiner, comprising:

a first control system coupled to the refiner, said refiner having refiner plates configured to apply a rotational abrasive fibrillating force to a fibrous material passing through the refiner plates, the first control system being configured to measure operating conditions of the refiner; and a processing unit coupled to the control system, the processing unit being configured to, receive during an actual operation of the refiner a measured first operating condition and a measured second operating condition of the refiner from the control system, generate a predicted first operating condition and a predicted second operating condition which is different from the predicted first operating condition, compare during said actual operation of the refiner the measured first operating condition to the predicted first operating condition to determine an unpredicted first operating condition;

compare during said actual operation of the refiner the measured second operating condition to the predicted second operation condition to determine an unpredicted second operating condition;

estimate during the actual operation of the refiner a first disturbance in the refiner based on a weighted sum of the unpredicted first and second operating conditions; and provide a control signal for the refiner based on the estimated first disturbance, wherein the control system is further configured to control the refiner based on the control signal associated with the first disturbance 44. The system of claim 43, wherein, the first operating condition is a motor load of the refiner, and the second operating condition is a refiner consistency of the refiner.

45. The system of claim 43, wherein the first and second predicted operating conditions are generated from a set of process inputs including at least one of a plate gap, a dilution flow rate, and a feed screw speed.

46. The system of claim 43, further comprising:

a second control system coupled to the control system and coupled to the processing unit, the second control system being configured to, receive the first disturbance from the processing unit, generate a target parameter for the refiner based on the first disturbance, and transmit the target parameter to the control system.

47. A fiber processing system comprising:

a refiner having refiner plates configured to process a fibrous material by use of a rotational abrasive fibrillating force applied to the fibrous material passing through the refiner plates;

a plurality of measurement units coupled to the refiner to measure different operating conditions of the refiner;

a first control system coupled to the plurality of measurement units and configured to receive during an actual operation of the refiner a plurality of measured operation conditions of the refiner from the plurality of measurement units;

a processing unit coupled to the control system and configured to estimate a production disturbance and a feed consistency disturbance of the refiner based on the plurality of measured operation conditions and based on weighted sums of predicted and unpredicted measured operating conditions; and a second control system coupled to the processing unit and configured to generate during said actual operation of the refiner a target operating condition based on the production disturbance and the feed consistency disturbance, wherein the first control system is further configured to control al operation of the refiner based on the target operating condition.

48. The fiber processing system of claim 47, further comprising:

a storage medium including a computer readable code that, when executed, causes the processing unit to estimate the production disturbance and the feed consistency disturbance based on the plurality of operation conditions.

49. The fiber processing system of claim 47, wherein the plurality of measurement units includes at least two of a feed screw sensor, a fluid flow rate sensor, a motor load sensor, a plate gap sensor, and a refiner consistency sensor.

50. The fiber processing system of claim 47, wherein the refiner includes at least two refiner plates and a feed screw.

* * * * *